United States Patent [19]

DeRocher

[11] Patent Number: 4,633,972

[45] Date of Patent: Jan. 6, 1987

[54] SPEAKER RETAINER

[75] Inventor: Benjamin K. DeRocher, Rochester, Mich.

[73] Assignee: General Motors Corporation, Detroit, Mich.

[21] Appl. No.: 771,632

[22] Filed: Sep. 3, 1985

[51] Int. Cl.$^4$ .............................................. H04R 7/20
[52] U.S. Cl. ................................... 381/188; 181/150; 181/172; 381/86; 24/459; 248/27.1; 248/505; 181/141
[58] Field of Search ............................. 248/610–611, 248/27.1, 309.1, 310, 314, 342, 505; 179/146 R, 146 E; 181/150, 172, 141, 171; 24/72.7, 459, 150 FP; 381/86

[56] References Cited

U.S. PATENT DOCUMENTS

| 838,555 | 12/1906 | Levy | 24/481 |
| 2,932,514 | 4/1960 | Bergmark | 248/505 |
| 3,855,429 | 12/1974 | Krainhöfer | 179/146 R |
| 4,312,258 | 1/1982 | Park | 181/172 |

FOREIGN PATENT DOCUMENTS

| 1950188 | 5/1971 | Fed. Rep. of Germany | 179/146 R |
| 2334665 | 1/1975 | Fed. Rep. of Germany | 179/146 R |

Primary Examiner—J. Franklin Foss
Assistant Examiner—Robert A. Olson
Attorney, Agent, or Firm—Herbert Furman

[57] ABSTRACT

A speaker retainer for mounting a speaker to a vehicle body panel is formed of molded elastomeric material and includes a cup-shaped portion for receiving the magnet portion of the speaker and oppositely extending straps which are releasably cooperable with integral attachment means on the body panel to releasably hold the cone shaped portion of the speaker against the panel. The cup-shaped portion can also mount a fastener for mounting an acoustic cover on the body panel.

3 Claims, 3 Drawing Figures

SPEAKER RETAINER

This invention relates generally to retainers for mounting speakers on a vehicle body and more particularly to a retainer for mounting a cone type speaker on a vehicle body panel.

It is known to mount speakers on vehicle body panels, such as shelf panels, by the use of metal retainers hooked to the shelf panel adjacent an opening therein. The retainer holds the speaker cone against the shelf panel around the opening.

The speaker retainer of this invention, in its preferred embodiment, is of molded resilient plastic material and generally includes a cup-shaped portion for receiving and supporting the magnet portion of a cone type speaker and oppositely extending straps which secure the cup-shaped portion to the vehicle body panel on opposite sides of the opening therein. At least one strap includes a button head end which is received within a keyhole shaped opening of the panel and one oppositely extending strap includes an eyelet end which is received over an integral tab lanced from the panel. The straps resiliently hold the flange edge of the cone portion of the speaker against the panel around the opening therein. Additionally, a fastener is secured to the base of the cup-shaped portion and includes bendable tabs which are forced through an acoustic cover to secure the cover to the retainer. The cover covers the retainer and speaker and is of soundproof type material.

The primary feature of this invention is that it provides an improved retainer for releasably mounting a cone type speaker to a vehicle body panel, with the retainer being of resilient plastic material and including a cup-shaped portion for receiving and supporting the magnet portion of the speaker and straps extending oppositely of each other from the cone-shaped portion for releasable attachment to the panel adjacent the opening therein to resiliently hold the flanged edge cone portion of the speaker against the panel. Another feature is that at least one of the straps has a button head portion received within a key hole shaped opening of the panel to releasably secure the one strap to the panel. A further feature is that at least one oppositely extending strap is releasably secured to the panel through an eyelet portion of the strap receiving a tab of the panel. Yet another feature is that the cup-shaped portion of the retainer includes means for releasably attaching an acoustic cover thereto to mount the cover over the retainer and speaker when the retainer and speaker are mounted to the body panel.

These and other features will be readily apparent from the following specification and drawings wherein.

Figure 1:
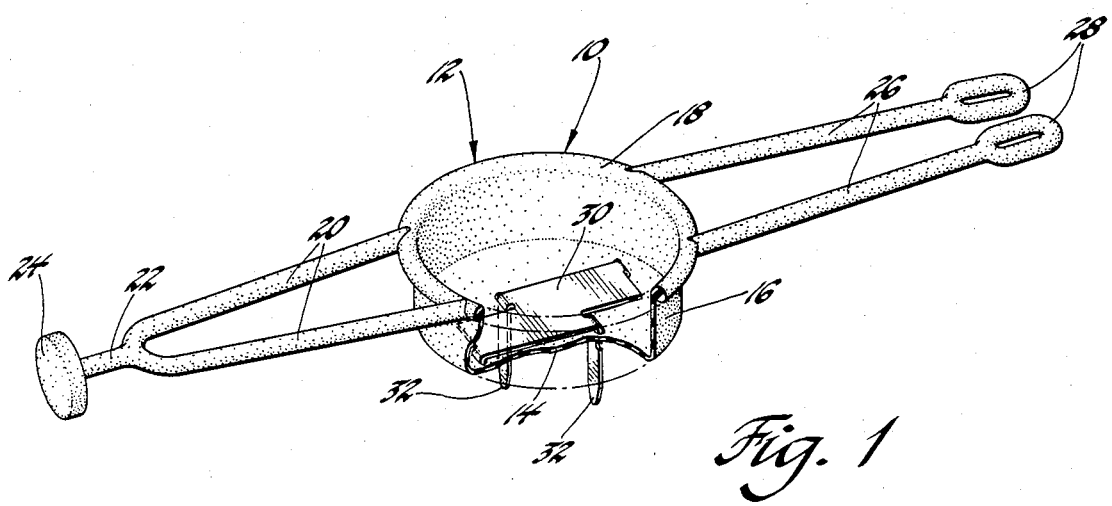
FIG. 1 is a partially cut away perspective view of a speaker retainer according to this invention.

Referring now particularly to FIG. 1 of the drawings, a retainer 10 according to this invention includes a cup-shaped portion 12 having a base wall 14, a side wall 16 and a lateral flange or rib 18. The cup-shaped portion is molded of resilient plastic material, such as thermoplastic urethane. A first strap 20 extends from the flange 18. The strap 20 is generally of elongated U-shape configuration and includes a tube portion 22 at the bight thereof and a button head portion 24. The tube portion 22 and button head portion 24 are formed integral with the strap 20 which in turn is formed integral with the cup-shaped portion 12.

A pair of like straps 26 extend from the flange 18 generally diametrically opposite the legs of the strap 20. The straps 26 are likewise molded integral with the cup-shaped portion 12 and each terminates in an eyelet portion 28 of elongated O configuration. A mounting fastener 30 of generally planar configuration seats against the inside of the base wall 14 of the cup-shaped portion 12 and includes a series of integral lateral tabs 32 and 34 which extend through the base wall 14. Tabs 34 are bent over the outside of base wall 14 to secure fastener 30 to the cup-shaped portion 12.

Figure 2:
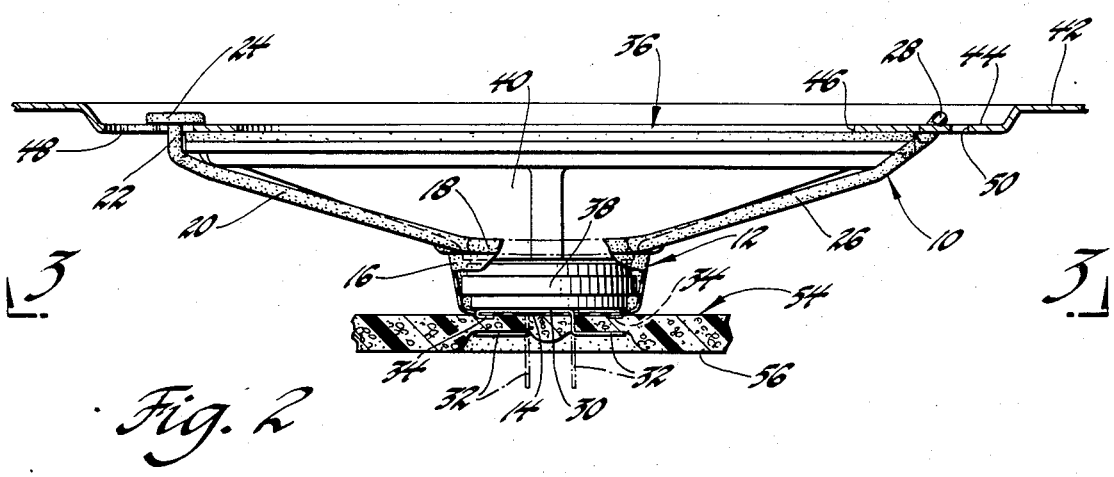
FIG. 2 is a partially cut away view showing the speaker retainer mounting a conventional cone type speaker to a vehicle body shelf panel.
Figure 3:
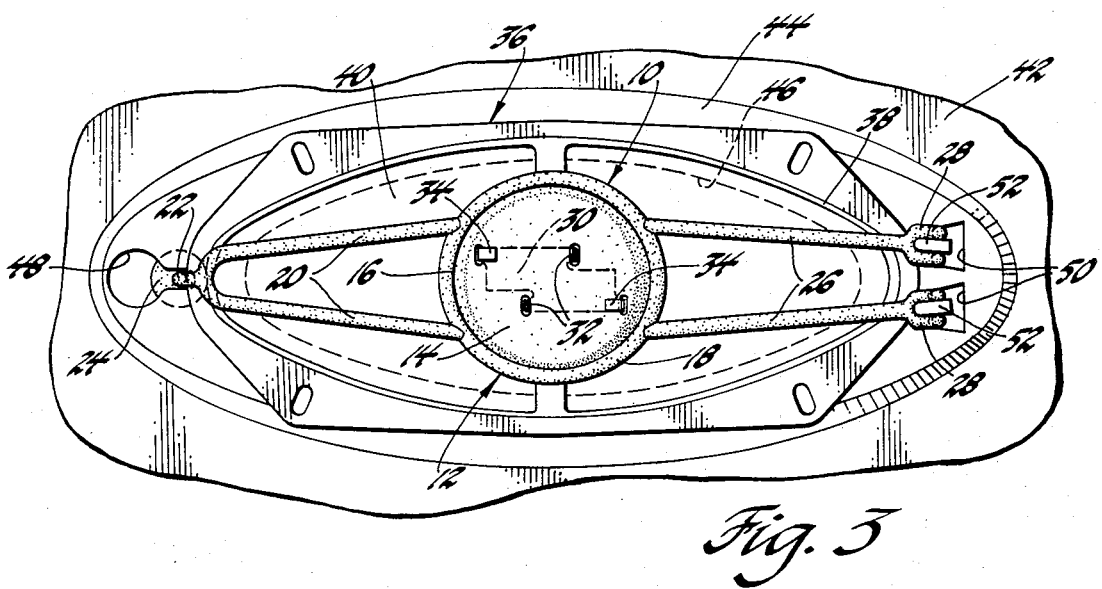
FIG. 3 is a view taken along line 3—3 of FIG. 2.

As best shown in FIGS. 2 and 3, a conventional cone type speaker 36 includes a magnet portion 38 and a cone portion 40 having a flanged edge. The speaker 36 forms no part of this invention and therefore the details thereof are not shown or described. The speaker 36 is horizontally mounted on a conventional shelf panel 42 of the vehicle body, not shown. The shelf panel has a depressed wall 44 provided with an opening 46. The opening 46 is generally of oval configuration, the same as that of the cone portion 40 of the speaker 36, but of smaller complementary size. The wall 44 is provided with a keyhole shaped opening 48 on one narrow end thereof and a pair of openings 50 on the other narrow end thereof, with the material of the openings 50 being formed into lateral tabs 52.

When it is desired to mount the speaker 36 on the shelf panel 42, the eyelet ends 28 of the straps 26 are fitted over the tabs 52. The magnet portion 38 of the speaker is then fitted within the cup-shaped portion 12 of the retainer. The button head end 24 of the retainer is then inserted within the larger portion of the keyhole shaped opening 48 and moved into engagement with the closed end of the smaller portion so that the retainer resiliently holds the flanged edge of the cone shaped portion 40 against the lower side of the wall 44 of shelf panel 42, around opening 46, as shown in FIGS. 2 and 3 to mount the speaker to the shelf panel. It can be seen from the foregoing that the mounting can be very simple and easy. The elasticity of the straps 20 and 26 provides for taking up of resonance and tolerance problems while providing for resilient mounting of the speaker to the shelf panel.

Normally, speakers are covered by an acoustic cover of frusto-conical configuration. If such a cover 54 is used, the tabs 32 can be forced through the base wall 56 of the cover and thereafter bent over as shown in dash lines and full lines in FIG. 2 to secure the cover to the cup-shaped portion 12. The cover normally seats against the underside of the shelf panel 42 outwardly of the depressed wall 42.

Thus this invention provides an improved speaker retainer.

The embodiments of the invention in which an exclusive property or privilege is claimed are defined as follows:

1. In a vehicle panel having a speaker opening therethrough, the combination comprising, a speaker having a magnet portion and a cone portion, and a retainer for securing the speaker to the vehicle panel, said retainer including a generally cup-shaped portion for supporting the speaker magnet, and elastic attaching means extending oppositely of each other from the cup-shaped portion for securement to the vehicle panel adjacent the opening therethrough to resiliently hold the cone portion of the speaker against the panel around the panel opening.

2. In a vehicle panel having a speaker opening therethrough, the combination comprising, a speaker having a magnet portion and a cone portion, and a retainer for securing the speaker to the vehicle panel, said retainer including a generally cup-shaped portion of resilient plastic material receiving the speaker magnet therein, and elastic attaching straps extending oppositely of each other from the cup-shaped portion for securement to the vehicle panel to resiliently hold the cone portion of the speaker against the panel adjacent the opening therethrough, at least one of said straps including a button head end for receipt within a keyhole shaped opening of the panel and at least one oppositely extending strap including an eyelet end for receipt over a tab of the panel.

3. In a vehicle panel having a speaker opening therethrough, the combination comprising, a speaker having a magnet portion and a cone portion, and a retainer for securing the speaker to the vehicle panel, said retainer including a generally cup-shaped portion of resilient plastic material having a base and supporting the speaker magnet, a plurality of elastic attaching straps, at least one of said straps extending in one direction from said cup-shaped portion, and at least another of said straps extending oppositely of said one strap, means on the ends of the straps for releasable securement to cooperating means on the panel adjacent the opening therethrough, and means extending from the base of the cup-shaped portion for securing an acoustic cover to the retainer for covering the retainer and the speaker.

* * * * *